(12) United States Patent
Oenbrink et al.

(10) Patent No.: US 6,538,073 B1
(45) Date of Patent: Mar. 25, 2003

(54) POLYAMIDE GRAFT COPOLYMERS

(75) Inventors: Georg Oenbrink, Duelmen (DE); Harald Haeger, Marl (DE); Ralf Richter, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 09/604,281

(22) Filed: Jun. 26, 2000

(30) Foreign Application Priority Data

Jun. 29, 1999 (DE) .......... 199 29 885
Feb. 9, 2000 (DE) .......... 100 05 639

(51) Int. Cl.⁷ .............................................. C08L 77/00
(52) U.S. Cl. ............................ 525/420; 525/435
(58) Field of Search ................... 525/420, 435

(56) References Cited

U.S. PATENT DOCUMENTS

| | | | |
|---|---|---|---|
| 3,442,975 A | * 5/1969 | Cawthon et al. | |
| 5,006,406 A | 4/1991 | Kovacs et al. | 428/323 |
| 5,859,148 A | 1/1999 | Borggreve et al. | 525/420 |

FOREIGN PATENT DOCUMENTS

| | | |
|---|---|---|
| EP | 0 307 810 | 3/1989 |
| EP | 0 377 259 | 7/1990 |
| EP | 0 672 703 | 9/1995 |
| WO | WO 97/46747 | 12/1997 |
| WO | WO 99/64496 | 12/1999 |

* cited by examiner

*Primary Examiner*—Ana Woodward
(74) *Attorney, Agent, or Firm*—Oblon, Spivak, McClelland, Maier & Neustadt, P.C.

(57) ABSTRACT

A graft copolymer suitable as a blend component or as a hot-melt adhesive, which contains the following monomer units:

a) from 0.5 to 25% by weight, based on the graft copolymer, of a polyamine having at least 11 nitrogen atoms and a number-average molar mass $M_n$ of at least 500 g/mol; and b) an equimolar combination of diamine and dicarboxylic acid as polyamide-forming monomers.

54 Claims, No Drawings

POLYAMIDE GRAFT COPOLYMERS

BACKGROUND OF THE INVENTION

1. Field of the Invention

The present invention is directed to a polyamide graft copolymer which is composed of a polyamine moiety and grafted-on polyamide chains.

2. Discussion of Related Art

Graft copolymers based on polyamine and polyamide are known. They may be prepared, for example, by cationic polymerization of caprolactam in the presence of polyethyleneimine hydrochloride dendrimers as core molecule (J. M. Warakomski, Chem. Mater. 1992, 4, 1000–1004). Compared with linear nylon-6, nylon-6 dendrimers of this type a have markedly reduced melt viscosity and solution viscosity, but unchanged tensile strength, stiffness, melting points, enthalpies of fusion and barrier action with respect to oxygen.

Graft copolymers based on polyvinylamine and polyamide are known from U.S. Pat. No. 2,615,863. Further, U.S. Pat. No. 3,442,975 describes graft copolymers which are prepared by polymerizing lactams in the presence of high-molecular-weight polyethyleneimine.

DE-A 19 15 772 describes blends made from a polyimine-polyamide graft copolymer, and also from a polyolefin and/or polyester, which are processed to give fibers which are easy to color.

Finally, DE-A 196 54 179 describes H-shaped polyamides which are prepared from lactams or aminocarboxylic acids, from an at least trifunctional amine, from dibasic carboxylic acids and from monobasic carboxylic acid. There is a certain ratio here of the two last named compounds to one another and of these to the functional groups of the at least trifunctional amine. The products have improved melt stability.

Polyamide graft copolymers of this type are suitable, for example, as a blend component for providing a molding composition with better processing performance or better compatibility with other polymers. However, the compatibility of currently known graft copolymers, mainly containing nylon-6 graft chains, with respect to polyamides derived from a combination of diamine and dicarboxylic acid is not always ideal when these polyamides are used as a base for molding compositions.

There has to date been no disclosure of analogous polyamide graft copolymers which contain graft chains derived from a combination of diamine and dicarboxylic acid. A possible reason for this is that attempts to prepare them from diamine, dicarboxylic acid and a polyamine give a crosslinked product.

SUMMARY OF THE INVENTION

The object of the present invention, therefore, is to provide polyamide graft copolymers containing graft chains derived from a combination of diamine and dicarboxylic acid. This object has been achieved using a process as described below.

The present invention, therefore, provides a graft copolymer which contains the following monomer units:

a) from 0.5 to 25% by weight, preferably from 1 to 20% by weight and particularly preferably from 1.5 to 16% by weight based on the graft copolymer, of a polyamine having at least 11 nitrogen atoms and a number-average molecular weight (Mn) of at least 500 g/mol and preferably at least 800 g/mol;

b) a substantially equimolar combination of diamine and dicarboxylic acid as a polyamide-forming monomer; and c) optionally, lactam and/or ω-aminocarboxylic acid as a further polyamide-forming monomer, where these can provide not more than 95% by weight, preferably not more than 90% by weight, particularly preferably not more than 70% by weight and very particularly preferably not more than 50% by weight, of the polyamide graft chains.

The terms "substantially" and "about" in the present application are used to denote a value within 10% variation from the specified value.

DESCRIPTION OF THE PREFERRED EMBODIMENTS

The following classes of substances may, for example, be used as polyamine:

polyvinylamines (Rompp Chemie Lexikon (Rompp's Chemical Encyclopedia), 9th edition, vol. 6, p. 4921, Georg Thieme Verlag Stuttgart 1992);

polyamines prepared from alternating polyketones (DE-A 196 54 058);

dendrimers, such as
$((H_2N-(CH_2)_3)_2N-(CH_2)_3)_2-N(CH_2)_2-N((CH_2)_2-N((CH_2)_3NH_2)_2)_2$ (DE-A 196 54 179) or 3,15-bis(2-aminoethyl)-6,12-bis[2-[bis(2-aminoethyl)amino]ethyl]-9-[2-[bis[2-bis(2-aminoethyl)amino]ethyl]amino]ethyl]-3,6,9,12,15-pentaazaheptadecane-1,17-diamine (J. M. Warakomski, Chem. Mat. 1992, 4, 1000–1004);

linear polyethyleneimines which can be prepared by polymerizing 4,5-dihydro-1,3-oxazoles followed by hydrolysis (Houben-Weyl, Methoden der Organischen Chemie (Methods of Organic Chemistry), vol. E20, pp 1482–1487, Georg Thieme Verlag Stuttgart, 1987);

branched polyethyleneimines obtainable by polymerizing aziridines (Houben Weyl, Methoden der Organischen Chemie (Methods of Organic Chemistry), vol. E20, pp. 1482–1487, Georg Thieme Verlag Stuttgart, 1987) and which generally have the following amino group distribution:
from 25 to 46% of primary amino groups,
from 30 to 45% of secondary amino groups, and
from 16 to 40% of tertiary amino groups.

The polyamine preferably has a number-average molecular weight ($M_n$) of not more than 20,000 g/mol, particularly preferably not more than 10,000 g/mol and in particular not more than 5000 g/mol.

Examples of combinations of a diamine and a dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid and dodecamethylenediamine/2,6-naphthalenedicarboxylic acid. However, besides these it is also possible to use any other combination, such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam or dodecamethylenediamine/2,6-naphthalenedicarboxylic acid/laurolactam.

Lactams or ω-aminocarboxylic acids which are used as polyamide-forming monomers contain from 4 to 19 carbon atoms, in particular from 6 to 12 carbon atoms. Particular preference is given to ε-caprolactam, ε-aminocaproic acid, caprylolactam, ω-aminocaprylic acid, laurolactam, ω-aminododecanoic acid and/or ω-aminoundecanoic acid.

In one preferred embodiment the graft copolymer is prepared with concomitant use of an oligocarboxylic acid which has been selected from the group consisting of from 0.015 to about 3 mol % of dicarboxylic acid and from 0.01 to about 1.2 mol % of tricarboxylic acid, based in each case on the total of the other polyamide-forming monomers. As pointed out above, the term "about" is used to denote an amount within 10% of the specified amount. In this calculation each of the monomers in the equimolar combination of diamine and dicarboxylic acid is treated separately. The polyamide-forming monomers therefore have overall a slight excess of carboxyl groups. The upper limit given for dicarboxylic acid and, respectively, tricarboxylic acid is merely intended to ensure that the resultant graft copolymer is thermoplastic and not crosslinked. According to current understanding, these upper limits are good guideline values. However, in individual cases, especially when using relatively high amounts of polyamine, higher amounts of oligocarboxylic acid may be added. Graft copolymers of this type are also within the scope of the invention. If a dicarboxylic acid is used it is preferable to use from 0.03 to 2.2 mol %, particularly preferably from 0.05 to 1.5 mol %, very particularly preferably from 0.1 to 1 mol % and in particular from 0.15 to 0.65 mol %. If a tricarboxylic acid is used the amount is preferably from 0.02 to 0.9 mol %, particularly preferably from 0.025 to 0.6 mol %, very particularly preferably from 0.03 to 0.4 mol % and in particular from 0.05 to 0.25 mol %. The concomitant use of the oligocarboxylic acid markedly improves solvent resistance and fuel resistance, and in particular resistance to hydrolysis and alcoholysis, and environmental stress cracking resistance, but also improves swelling behavior and, associated therewith, dimensional stability, and also barrier action with respect to diffusion.

The oligocarboxylic acid used may be any desired di- or tricarboxylic acid having from 6 to 24 carbon atoms, such as adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid and/or trimellitic acid.

If desired, use may also be made, as regulators, of aliphatic, alicyclic, aromatic, arylalkyl and/or substituted monocarboxylic acids having from 3 to 50 carbon atoms, e.g. lauric acid, unsaturated fatty acids, acrylic acid or benzoic acid. These regulators can reduce the concentration of amino groups without altering the form of the molecule. This method also allows the introduction of functional groups, such as double bonds or triple bonds, etc. It is, however, desirable for the graft copolymer to have a substantial number of amino groups. The amino group concentration in the graft copolymer is preferably from 100 to 2500 mmol/kg, particularly preferably from 150 to 1500 mmol/kg and very particularly preferably from 250 to 1300 mmol/kg. For the purposes of the present invention, here and below amino groups are not only terminal amino groups but also any secondary or tertiary amine functions which may be present in the polyamine.

Various processes may be used to prepare the novel graft copolymers.

One preferred process is carried out in two stages of which the first is the prepolymerization of diamine and dicarboxylic acid, and also of the optional cocomponents lactam or ω-aminocarboxylic acid. In the second step the polyamine is added, while the oligocarboxylic acid which may be used concomitantly, if desired, is metered in prior to, during or after the prepolymerization. The pressure is then reduced at from 200 to 290° C. and the polycondensation is carried out under a flow of nitrogen or under vacuum.

Another preferred process consists in the hydrolytic degradation of a polyamide to give a prepolymer and simultaneous or subsequent reaction with the polyamine. The polyamides used are preferably those in which the terminal group difference is approximately zero or those which already incorporate the oligocarboxylic acid which may, if desired, be used concomitantly.

However, the oligocarboxylic acid may also be added at the beginning or during the course of the degradation reaction.

These processes can be used to prepare extremely highly branched polyamides with acid numbers below 40 mmol/kg, preferably below 20 mmol/kg and particularly preferably below 10 mmol/kg. Virtually complete conversion is achieved after reaction times as short as from one to five hours at temperatures of from 200° C. to 290° C.

An additional step of continuing heating under vacuum, lasting a number of hours may follow, if desired. This step may last at least four hours, preferably at least six hours and particularly preferably at least eight hours, at from 200 to 290° C. After an induction period of a number of hours, an increase in the melt viscosity is then observed, probably due to a reaction of terminal amino groups with one another with elimination of ammonia and chain-linking resulting in an increase in the molecular weight. This increase in the molecular weight is particularly advantageous in molding compositions intended for extrusion.

If it is not desirable to carry out the reaction to completion in the melt, the highly branched polyamide may also be post-condensed in the solid state as in the prior art.

The novel graft copolymers may be used for molding compositions intended for injection molding or extrusion. They may also be used as a blend component for modifying performance characteristics, or as hot-melt adhesives.

The results listed in the examples were determined with the aid of the following test methods.

To determine carboxyl end groups, 1 g of graft copolymer was dissolved in 50 ml of benzyl alcohol at 165° C. under nitrogen. The time required for this was not more than 20 min. The solution was titrated with a solution of KOH in ethylene glycol (0.05 mol KOH/l) using phenolphthalene as indicator, until the color changed.

To determine amino groups, 1 g of the graft copolymer was dissolved in 50 ml of m-cresol at 25° C. The solution was titrated potentiometrically with perchloric acid.

Solution viscosity $\eta_{rel}$ (relative viscosity) was determined using a 0.5% strength by weight m-cresol solution at 25° C. as in DIN 53727/ISO 307.

Having generally described this invention, a further understanding can be obtained by reference to certain specific examples which are provided herein for purposes of illustration only and are not intended to be limiting unless otherwise specified.

The priority documents, German patent application 19929885, filed Jun. 29, 1999 and German patent application patent application 10005639.3, filed Feb. 9, 2000, are incorporated herein by reference in their entirety.

EXAMPLES

Comparative Example 1

5.570 kg of adipic acid (38.12 mol) were melted at 160° C. and transferred into a polymerization vessel heated to 180° C. A mixture made from 4.430 kg of hexamethylenediamine (38.12 mol), 440 g of water and 86 g of polyethyleneimine (LUPASOL G 100 from BASF AG, Ludwigshafen, Germany) was then metered in and the mixture brought to 220° C. The condensation was then started under a pressure of 20 bar for a period of 1.5 hours, followed by stepwise pressure reduction to atmospheric pressure, while at the same time the temperature was increased to 280° C. The viscosity of the reaction mixture rose sharply during this procedure, causing the stirrer to stop. It was impossible to discharge the product from the vessel.

Example 1

8.0 kg of nylon-6,6 (ULTRAMID A3 from BASF AG, Ludwigshafen, Germany) and 320 g of water were transferred into a pressure-tight polycondensation vessel with a gauge pressure of 0.2 bar set using nitrogen. This was followed by heating, without stirring, at 270° C. for 7 hours, whereupon the pressure rose to 20 bar. The stirrer was then switched on and the pressure reduced to a residual water vapor pressure of 5 bar within a period of 3 hours. 80 g of polyethyleneimine (LUPASOL G 100 from BASF AG, Ludwigshafen, Germany) were then metered in and incorporated under autogenic pressure, and the pressure was then reduced to atmospheric pressure and nitrogen passed over the mixture at 270° C. for 2 hours. The clear melt was discharged via a melt pump in the form of an extrudate, cooled in a water bath and then pelletized. The following properties were exhibited:

$\eta_{rel}$: 1.62 melting point $T_m$: 259° C.

amino group concentration: 201 mmol/kg carboxyl end group concentration: <20 mmol/kg Obviously, numerous modifications and variations of the present invention are possible in light of the above teachings. It is therefore to be understood that within the scope of the appended claims, the invention may be practiced otherwise than as specifically described herein.

What is claimed is:

1. A graft copolymer comprising,
   a) from 0.5 to 25% by weight, based on the graft copolymer, of a polyamine having at least 11 nitrogen atoms and a number-average molecular weight ($M_n$) of at least 500 g/mol;
   b) grafted on a) a substantially equimolar combination of a diamine and a dicarboxylic acid as polyamide-forming monomers, and
   c) from 0.01 to about 1.2 mol % of a tricarboxylic acid based on the total amount of the polyamide-forming monomers.

2. The graft copolymer as claimed in claim 1, further containing:
   a polyamide-forming monomer selected from the group consisting of lactam, (ω-aminocarboxylic acid and a mixture thereof; and
   wherein said polyamide-forming monomer provides not more than 95% by weight of the polyamide graft chains.

3. The graft copolymer as claimed in claim 1, wherein the amino group concentration of the copolymer is from 100 to 2500 mmol/kg and the acid number of said copolymer is below 40 mmol/kg.

4. A process for preparing the graft copolymer of claim 1, comprising reacting a polyamide prepolymer of b) with a polyamine a) in the presence of the tricarboxylic acid c).

5. The graft copolymer as claimed in claim 1, wherein said polyamine is present in an amount of from 1 to 20% by weight based on the graft copolymer.

6. The graft copolymer as claimed in claim 1, wherein said polyamine is present in an amount of from 1.5 to 16% by weight based on the graft copolymer.

7. The graft copolymer as claimed in claim 1, wherein the number-average molecular weight ($M_n$) of said polyamine is at least 800 g/mol.

8. The graft copolymer as claimed in claim 1, wherein said tricarboxylic acid is present in an amount of from 0.02 to 0.9 mol %, based on the total amount of the other polyamide-forming monomers.

9. The graft copolymer as claimed in claim 1, wherein said tricarboxylic acid is present in an amount of from 0.025 to 0.6 mol %, based on the total amount of the other polyamide-forming monomers.

10. The graft copolymer as claimed in claim 1, wherein said tricarboxylic acid is present in an amount of from 0.03 to 0.4 mol %, based on the total amount of the other polyamide-forming monomers.

11. The graft copolymer as claimed in claim 1, wherein said tricarboxylic acid is present in an amount of from 0.05 to 0.25 mol %, based on the total amount of the other polyamide forming monomers.

12. The graft copolymer as claimed in claim 1, wherein the amino group concentration of the copolymer is from 150 to 1500 mmol/kg.

13. The graft copolymer as claimed in claim 1, wherein the amino group concentration of the copolymer is from 250 to 1300 mmol/kg.

14. The graft copolymer of claim 1, wherein the tricarboxylic acid is selected from the group consisting of trimesic acid, trimellitic acid and mixtures thereof.

15. The graft copolymer of claim 1, further comprising a regulator selected from the group consisting of an aliphatic monocarboxylic acid, an alicyclic monocarboxylic acid, an aromatic monocarboxylic acid, an arylalkyl monocarboxylic acid, an unsaturated fatty acid, and mixtures thereof, polymerized with the dicarboxylic or tricarboxylic acid.

16. The graft copolymer of claim 1, farmer comprising a regulator selected from the group consisting of lauric acid, acrylic acid, benzoic acid and mixtures thereof, polymerized with the dicarboxylic or tricarboxylic acid.

17. A graft copolymer comprising,
   a) from 0.5 to 25% by weight, based on the graft copolymer, of a polyamine having at least 11 nitrogen atoms and a number-average molecular weight ($M_n$) of at least 500 g/mol; and
   b) grafted on a) a substantially equimolar combination of a diamine and a dicarboxylic acid as polyamide-forming monomers, and
   c) from 0.015 to about 3 mol % of a dicarboxylic acid in addition to that in b) based on the total amount of the other polymer-forming monomers.

18. The graft copolymer as claimed in claim 17, further comprising a polyamide-forming monomer selected from the group of a lactam, an aminocarboxylic acid and mixtures thereof; and
   wherein said polyamide-forming monomer provides not more than 95% by weight of the polyamide graft chains.

19. The graft copolymer as claimed in claim 17, wherein the amino group concentration of the copolymer is from 100 to 2500 mmol/kg and the acid number of said, copolymer is below 40 mmol/kg.

20. A process for preparing the graft copolymer of claim 17, comprising reacting a polyamide prepolymer of b) with a polyamine a) in the presence of the dicarboxylic acid c).

21. The graft copolymer as claimed in claim 17, wherein said polyamine is present in an amount of from 1 to 20% by weight based on the graft copolymer.

22. The graft copolymer as claimed in claim 17, wherein said polyamine is present in an amount of from 1.5 to 16% by weight based on the graft copolymer.

23. The graft copolymer as claimed in claim 17, wherein the number-average molecular weight ($M_n$) of said polyamine is at least 800 g/mol.

24. The graft copolymer as claimed in claim 17, wherein said dicarboxylic acid c) is present in an amount of from 0.03 to 2.2 mol %, based on the total amount of the other polyamide-forming monomers.

25. The graft copolymer as claimed in claim 17, wherein said dicarboxylic acid c) is present in an amount of from 0.05 to 1.5 mol %, based on the total amount of the other polyamide-forming monomers.

26. The graft copolymer as claimed in claim 17, wherein said dicarboxylic acid c) is present in an amount of from 0.1 to 1 mol %, based on the total amount of the other polyamide-forming monomers.

27. The graft copolymer as claimed in claim 17, wherein said dicarboxylic acid c) is present in an amount of from 0.15 to 0.65 mol %, based on the total amount of the other polyamide-forming monomers.

28. The graft copolymer as claimed in claim 17, wherein the amino group concentration of the copolymer is from 150 to 1500 mmol/kg.

29. The graft copolymer as claimed in claim 17, wherein the amino group concentration of the copolymer is from 250 to 1300 mmol/kg.

30. The graft copolymer of claim 17, further comprising a regulator selected from the group consisting of an aliphatic monocarboxylic acid, an alicyclic monocarboxylic acid, an aromatic monocarboxylic acid, an arylalkyl monocarboxylic acid, an unsaturated fatty acid, and mixtures thereof, polymerized with the dicarboxylic acid.

31. The graft copolymer of claim 17, further comprising a regulator selected from the group consisting of lauric acid, acrylic acid, benzoic acid and mixtures thereof, polymerized with the dicarboxylic acid.

32. A graft copolymer comprising,
a) from 0.5 to 25% by weight, based on the graft copolymer, of a polyamine having at least 11 nitrogen atoms and a number-average molecular weight ($M_n$) of at least 500 g/mol; and
b) grafted on a) a substantially equimolar combination of a diamine and a dicarboxylic acid as polyamide-forming monomers,
wherein said polyamine is a polyethyleneimine obtained by polymerizing at least one aziridine.

33. The graft copolymer of claim 32, wherein the polyamine comprises from 25 to 46% of primary amino groups, from 30 to 45% of secondary amino groups and from 16 to 40% of tertiary amino groups.

34. The graft copolymer as claimed in claim 32, further comprising
a polyamide-forming monomer selected from the group consisting of a lactam, an aminocarboxylic acid and mixtures thereof; and
wherein said polyamide-forming monomer provides not more than 95% by weight of the polyamide graft chains.

35. The graft copolymer as claimed in claim 32 further comprising
d) an oligocarboxylic acid selected from the group consisting of from 0.015 to about 3 mol % of a dicarboxylic acid other than in b) and from 0.01 to about 1.2 mol % of a tricarboxylic acid, based on the total amount in addition to the other polyamide-forming monomers.

36. The graft copolymer as claimed in claim 35, wherein said dicarboxylic acid is present in an amount of from 0.03 to 2.2 mol %, based on the total amount of the other polyamide-forming monomers.

37. The graft copolymer as claimed in claim 35, wherein said dicarboxylic acid is present in an amount of from 0.05 to 1.5 mol %, based on the total amount of the other polyamide-forming monomers.

38. The graft copolymer as claimed in claim 35, wherein said dicarboxylic acid is present in an amount of from 0.1 to 1 mol %, based on the total amount of the other polyamide-forming monomers.

39. The graft copolymer as claimed in claim 35, wherein said dicarboxylic acid is present in an amount of from 0.15 to 0.65 mol %, based on the total amount of the other polyamide-forming monomers.

40. The graft copolymer as claimed in claim 35, wherein said tricarboxylic acid is present in an amount of from 0.02 to 0.9 mol %, based on the total amount of the other polyamide-forming monomers.

41. The graft copolymer as claimed in claim 35, wherein said tricarboxylic acid is present in an amount of from 0.025 to 0.6 mol %, based on the total amount of the other polyamide-forming monomers.

42. The graft copolymer as claimed in claim 35, wherein said tricarboxylic acid is present in an amount of from 0.03 to 0.4 mol %, based on the total amount of the other polyamide-forming monomers.

43. The graft copolymer as claimed in claim 35, wherein said tricarboxylic acid is present in an amount of from 0.05 to 0.25 mol %, based on the total amount of the other polyamide-forming monomers.

44. The graft copolymer of claim 35, wherein d) is a tricarboxylic acid selected from the group consisting of trimesic acid, trimellitic acid and mixtures thereof.

45. The graft copolymer of claim 35, wherein d) is a tricarboxylic acid.

46. The graft copolymer of claim 32, further comprising a regulator selected from the group consisting of lauric acid, acrylic acid, benzoic acid and mixtures thereof, polymerized with the dicarboxylic acid.

47. The graft copolymer as claimed in claim 32, wherein the amino group concentration of the copolymer is from 100 to 2500 mmol/kg and the acid number of said copolymer is below 40 mmol/kg.

48. A process for preparing the graft copolymer of claim 32, comprising reacting a polyamide prepolymer of b) with a polyamine a).

49. The graft copolymer as claimed in claim 32, wherein said polyamine is present in an amount of from 1 to 20% by weight based on the graft copolymer.

50. The graft copolymer as claimed in claim 32, wherein said polyamine is present in an amount of from 1.5 to 16% by weight based on the graft copolymer.

51. The graft copolymer as claimed in claim 32, wherein the number-average molecular weight ($M_n$) of said polyamine is at least 800 g/mol.

52. The graft copolymer as claimed in claim 32, wherein the amino group concentration of the copolymer is from 150 to 1500 mmol/kg.

53. The graft copolymer as claimed in claim 32, wherein the amino group concentration of the copolymer is from 250 to 1300 mmol/kg.

54. The graft copolymer of claim 32, further comprising a regulator selected from the group consisting of an aliphatic monocarboxylic acid, an alicyclic monocarboxylic acid, an aromatic monocarboxylic acid, an arylalkyl monocarboxylic acid, an unsaturated fatty acid, and mixtures thereof, polymerized with the dicarboxylic acid.

* * * * *